Feb. 20, 1951  A. G. SMITH  2,542,717
MEANS FOR MEASURING OR INDICATING THE
RATIO OF TWO FORCES AND APPLICATIONS
THEREOF TO MACH NUMBER INDICATORS
Filed Feb. 13, 1946
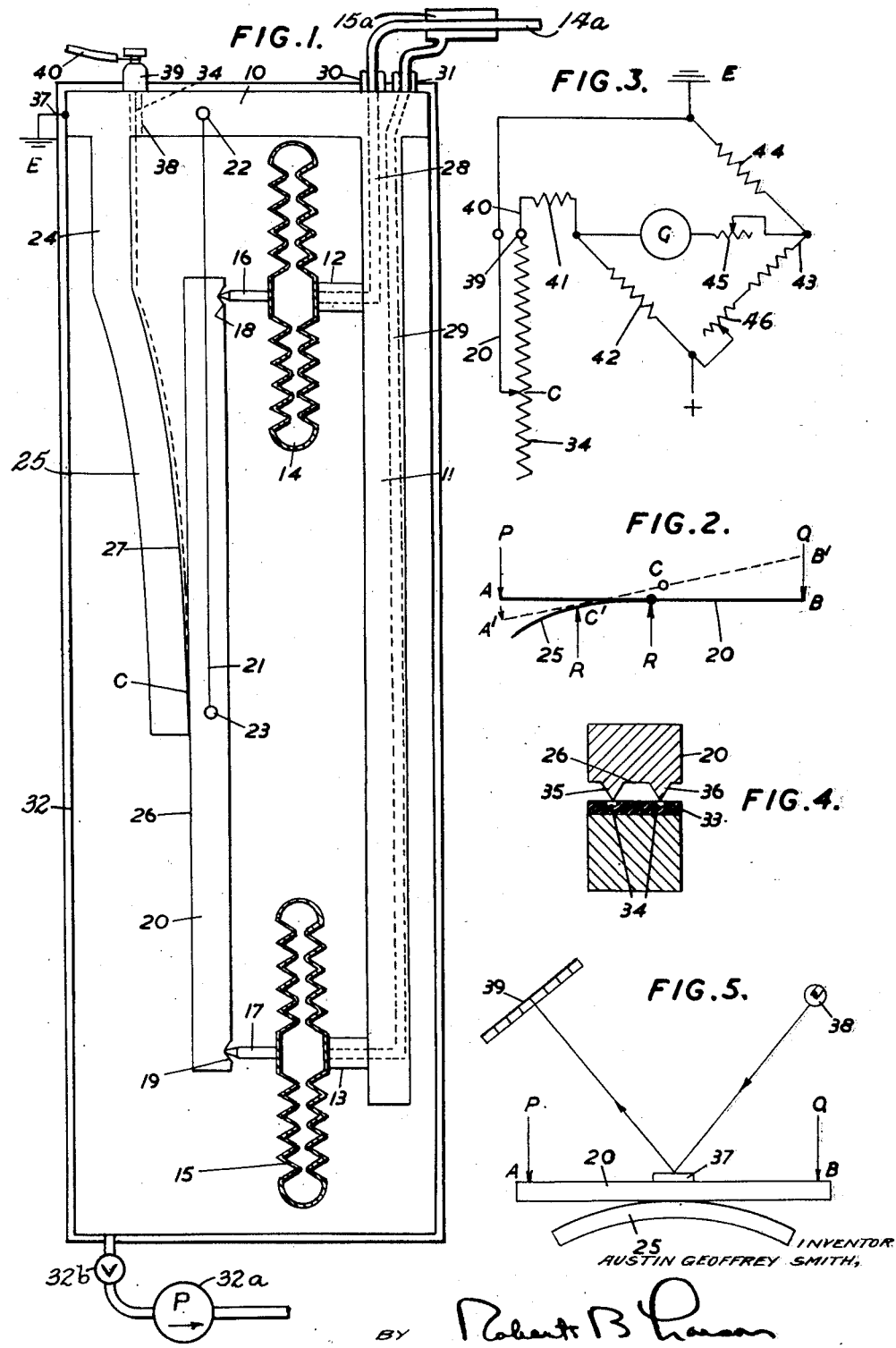
INVENTOR
AUSTIN GEOFFREY SMITH,
BY Robert B. [signature]
ATTORNEY Patented Feb. 20, 1951

2,542,717

UNITED STATES PATENT OFFICE 2,542,717

MEANS FOR MEASURING OR INDICATING THE RATIO OF TWO FORCES AND APPLICATIONS THEREOF TO MACH NUMBER INDICATORS

Austin Geoffrey Smith, Blaby, Leicester, England, assignor to Power Jets (Research and Development) Limited, London, England Application February 13, 1946, Serial No. 647,382
In Great Britain February 14, 1945

9 Claims. (Cl. 73—182)

This invention relates to measuring, indicating and the like apparatus from which a response proportional to the ratio of two forces is required, either for obtaining a direct indication or a continuous record of such ratio or for controlling some other apparatus in accordance with the variations of such ratio or for any analogous purpose.

The main object of the invention is to provide an apparatus of this kind in which the displacements of the points of application of the forces in question are minimised, without adversely affecting the sensitivity and accuracy of the response. This is especially important when the forces in question are derived from the action of fluid pressures on or in flexible capsules or chambers closed by flexible diaphragms, in which the accuracy with which the applied pressure is reflected by the force exerted by the movable attachment of the capsule or diaphragm is seriously impaired if the capsule or diaphragm becomes appreciably distorted, on account of the effects of the elasticity of the material of the capsule or diaphragm.

A special object of this invention is the provision of an instrument for indicating the Mach number of a stream of fluid. The Mach number at any point of the fluid stream is a function of the ratio of absolute dynamic pressure to absolute static pressure at that point, and these pressures can be applied to the fluid contained in tubes communicating with capsules in the instrument by means of conventional Pitot and static pressure heads. The conventional airspeed indicator registers the difference of these pressures by applying them to opposite sides of a diaphragm or capsule wall, but to obtain a response which is a measure of their ratio the pressures must be applied to separate capsules or diaphragms, the pressure on the opposite side of the diaphragm or capsule wall being in each case substantially zero. Mechanism is then required to measure the ratio of the forces exerted by the capsules or diaphragms.

According to the invention in its broadest aspect, in an apparatus for producing a response which is a measure of the ratio of two forces, the forces are applied at spacially separated points to a movable rigid member so supported that it is in stable equilibrium under the applied forces and the reaction of its support for any value of the ratio of applied forces within their working range, and so that the equilibrium configuration of the system varies with the ratio of the applied forces and is a measure thereof, means being included for observing, registering or utilising the variations of said configuration.

In a preferred form of construction, the apparatus comprises a rigid beam to which the two forces are applied at spaced points and which makes rolling contact on a fixed fulcrum member, the curvatures of the beam and fulcrum member being so proportioned relatively to the effective beam length that the shift of the rolling contact line which occurs upon a change in the ratio of the applied forces and is a measure of such change of ratio, is large compared with the displacements of the points of application of the two forces.

Alternatively the angular displacement of the beam may be taken as the measure of the ratio of the applied forces and optical or other known methods of magnifying small angular deflections may be embodied.

The rolling surface of the beam is perfectly straight and that of the fulcrum member convexly curved. To minimise friction the rolling contact surface either of the beam or of the fulcrum member may be formed as a pair of knife edges aligned in the direction of rolling.

According to a feature of the invention, the beam or the fulcrum or both incorporate electrically conducting rolling contact elements so connected to an electric circuit that the resistance in the circuit varies with the position of the line of rolling contact. The rolling contact elements thus constitute a potentiometer device, which when connected in an appropriate circuit may be made to give a direct indication of the ratio of the applied forces.

In a specific form of construction of the apparatus of this invention, adapted to give a response which is a measure of the Mach number of a stream of fluid, the forces applied to the beam are derived from two flexible capsules or diaphragm-closed chambers, whose free ends are connected to the beam at spaced points, the capsules or chambers being subjected respectively to the absolute dynamic and static pressures of the fluid stream.

The response of the instrument is therefor a measure of the ratio of the absolute dynamic and static pressures of the fluid stream, and hence of the Mach number.

A typical embodiment of the invention is illustrated by way of example in the accompanying drawings, of which, Fig. 1 shows a casing housing the capsule operated movement of an instrument for indicating Mach number, the view being taken at right angles to the plane of displacement of the movement, and the front of the casing being removed to expose the movement;

Fig. 2 is a force diagram,

Fig. 3 is a circuit diagram, and

Fig. 4 is a sectional view of a detail of the mechanism of Fig. 1.

Fig. 5 is a diagrammatic view of a modified type of instrument.

In the apparatus illustrated in the drawings, a robust metal base plate 10 is provided with an integral extension 11 at right angles to the base 10, to which are rigidly secured the hollow stems 12, 13 of a pair of flexible capsules 14, 15. The free ends of these capsules have solid needle-ended stems 16, 17 engaging in notches 18, 19 formed in a rigid metal beam 20, suspended from the base 10 on links 21, which are pivoted to the base at 22 and to the beam at 23 so that the beam is free to move bodily and to rock in the plane of the drawing; the suspension links 21, however, prevent the beam from moving bodily in the direction of its length.

The base 10 also has an integrally formed arm 24 which projects at right angles to the base and has a curved prolongation 25. This forms a fulcrum on which the beam 20 reacts. The face 26 of the beam being straight and the face 27 of the fulcrum arm 25 being curved convexly towards the beam, there is line contact between them at C. The beam being pressed against the fulcrum bar by the pressures in the capsules, applied at the needle ends of stems 16, 17, any rocking of the beam will cause it to roll on the curved face 27 of the fulcrum bar and thus the contact line C will be displaced along the fulcrum bar.

The instrument being required to give a measure of the Mach number of a stream of fluid the interiors of capsules 14, 15 are respectively connected to a "Pitot" pressure head 14a and a "static" pressure head 15a of conventional type which are placed in the fluid stream, the connections being by means of the hollow stems 12, 13, passages 28, 29 formed in the extension 11 of the base 10, and external tubes 30, 31.

Since the Mach number is a function of the ratio of the absolute dynamic and static pressures of the fluid the outside of the capsules must be at zero pressure as nearly as possible and the mechanism is therefore enclosed in an airtight casing 32 which is evacuated by a pump 32a and sealed for example, by a valve 32b.

The forces exerted on the beam by the capsules are therefore proportioned to the absolute dynamic and static pressures and these forces must balance about the line of rolling contact between the beam and its fulcrum bar. In Fig. 2 these forces are designated P and Q and their points of application to the beam A, B; the reaction of the fulcrum bar against the beam at C is designated R. When the fluid stream has zero velocity with respect to the Pitot and static heads the pressures in the two capsules are equal and therefore the fulcrum reaction R must be at the point $C_0$ equidistant from A and B; but when the fluid is in motion relatively to the Pitot and static heads the absolute dynamic pressure is greater than the absolute static pressure and the force P exerted by capsule 14 exceeds the force Q exerted by capsule 15, so that the beam is caused to roll on the fulcrum bar from the full line position $AC_0B$ of Fig. 2 to a new equilibrium position indicated by the dotted line $A'C'B'$ the reaction point being displaced along the fulcrum from $C_0$ to $C'$. The displacement is thus always from the midpoint $C_0$ towards A since Q can never be greater than P. The displacement $C_0C'$ is a measure of the ratio of P to Q, for, if the angular displacement of the beam is small, $$\frac{P}{Q}=\frac{B'C'}{A'C'}=\frac{\tfrac{1}{2}AB+C_0C'}{\tfrac{1}{2}AB-C_0C'}$$

or, writing $$\frac{P}{Q}=q$$

and $$\frac{C_0C'}{AB}=\frac{s}{2}, q=\frac{1+s}{1-s}\text{ or }s=\frac{q-1}{q+1} \qquad (1)$$

An object of the invention being to minimise the displacement of the points of application of the forces whose ratio is required, and more especially to minimise extension and contraction of the flexible capsules when such elements are used, as in the example illustrated, the contact face of the fulcrum bar has a large radius of curvature throughout, compared with the length of the beam between the capsule centres. In the example illustrated, the fulcrum bar face 27 is struck to a circular arc, but provided the curvature of this face does not vary abruptly and it has no flats, the actual shape of this face is not critical. If $\rho$ is the mean radius of curvature of the fulcrum face from $C_0$ to $C'$, it will be evident that $$\frac{AA'+BB'}{C_0C'}=\frac{AB}{\rho} \qquad (2)$$

and since AA' and BB' are the extension and contraction of the capsules it is possible to minimise these distortions while retaining a relatively large displacement as a measure of the ratio of the capsule forces by making $\rho$ large compared with AB, i. e. by using a fulcrum face with a large radius of curvature relatively to the effective beam length.

In the example illustrated the displacement of the line of rolling contact between the fulcrum bar face 27 and the beam face 26 is measured electrically. For this purpose the contact face 27 of the fulcrum bar carries an insulating strip 33 into which are let conducting strips 34 of fairly high resistance. The strips 34 are brought to the outside of the base plate 10 through an insulating bush 38 to a terminal 39 for connection to an external lead 40. The beam 20 is in electrical connection with the base plate 10 through the links 21 and the base plate is earthed at E. The strips 34 thus constitute a potentiometer of which the beam is the wiper, the resistance in circuit between the terminal 39 and earth being varied in accordance with the displacement of the rolling contact line C between the fulcrum bar and beam.

The instrument may be connected in an ordinary bridge circuit, as shown in Fig. 3, consisting of 3 arms, 42, 43, 44, the fourth arm being provided by a fixed resistance 41 and the length of conducting strip 34 between the terminal 39 and the contact at C with the beam, which is earthed. The positive applied at the junction of the arms 42 and 43 and a galvanometer G is connected across the bridge as shown. For initial balancing the arm 43 includes a variable resistance 46, and the galvanometer is provided with the usual variable series resistance 45. With this conventional type of circuit the reading of the galvanometer can be used to measure changes of resistance in the arm 20, 34, 41 of the bridge and thereby measure the displacement of the line of rolling contact between the fulcrum bar 25 and the beam 20; and as already stated this displacement is a measure of the ratio of the pressures applied to the capsules 14, 15 and hence of the Mach number of the fluid stream in which the Pitot and static heads are immersed.

For simplicity and convenience the constants of the circuit may be adjusted so that galvanometer deflection "G" is directly proportional to the fulcrum shift, $s$, of Equations 1, whence $$G = k\frac{q-1}{q+1} \quad (3)$$

$k$ being a constant of the circuit and galvanometer sensitivity. The Mach number corresponding to the various values of $$\frac{q-1}{q+1}$$

can be computed and the galvanometer scale calibrated accordingly to read Mach numbers directly.

To minimise friction, the surface 26 of the beam 20 is preferably formed with a pair of parallel knife edges 35, 36 aligned in the direction of rolling and making contact with the conducting strips 34, carried by the fulcrum bar 25 as shown in Fig. 4.

An alternative form of instrument in which the angular displacement of the beam is used as a measure of the ratio of the applied forces is shown diagrammatically in Fig. 5. In this, the beam 20, to which the forces P and Q are applied at A and B and which is supported on a curved fulcrum bar 25, as in the apparatus described with respect to Fig. 1, carries a mirror 37 which reflects an incident beam of light from a source 38 on to a scale 39, the light ray being indicated by an arrow. For certain purposes it may be required to measure the ratio by which the two fluid pressures differ from a datum pressure, e. g. atmospheric pressure. In this case an apparatus as shown in Fig. 1 may be used, the interior of the casing 32 being vented to atmosphere or connected to a chamber or the like in which the required datum pressure is maintained.

I claim:

1. In measuring, indicating and like apparatus responsive to forces and adapted to measure or indicate the ratio thereof, the combination of a rigid beam to which the forces are applied at spaced points thereon, a fixed and curved fulcrum member adapted for rolling contact with the beam, electrical resistance rolling contact elements incorporated respectively in the beam and fulcrum member, means for applying the forces to the beam and adapted to cause the beam to roll in contact with the fulcrum member with the electrical resistance rolling contact elements contacting to assume a contacting position in accordance with the ratio of the forces, and an electrical circuit connected through the elements and adapted to measure the resistance thereof to give a measure or indication of the ratio of the forces.

2. In measuring, indicating or like apparatus responsive to fluid pressures and adapted to measure or indicate the ratio thereof, the combination of a rigid beam to which the fluid pressures are applied at spaced points thereon, a fixed and curved fulcrum member adapted for rolling contact with the beam, fluid pressure sensitive capsules immovably anchored each by one end and adapted to support the beam by their free ends, to apply the fluid pressures to the beam to cause the beam to roll in contact with the fulcrum member and assume a contacting position in accordance with the ratio of the fluid pressures, electrical resistant elements incorporated respectively in the beam and fulcrum member and adapted for rolling contact, and an electrical circuit connected to said resistance elements adapted to measure the resistance thereof to give a measure or indication of the ratio of the fluid pressures, the resistance varying with the assumed contacting position.

3. An apparatus for measuring the Mach number of a stream of fluid comprising in combination a pair of fluid pressure sensitive capsules each immovably anchored by one end, a rigid beam adapted to be supported at spaced points thereon by the free ends of the capsules, a fixed and curved fulcrum member adapted for rolling contact with the beam, means adapted to establish a pressure difference substantially equal to the absolute dynamic pressure of the fluid stream across the walls of one of the capsules, means adapted to establish a pressure difference substantially equal to the absolute static pressure of the fluid stream across the walls of the other of the capsules, the capsules being adapted to apply the absolute dynamic pressure and the absolute static pressure to the beam to cause it to roll in contact with the fulcrum member and assume a contacting position in accordance with the ratio of the two pressures, that is, the Mach number, electrical resistance rolling contact members incorporated respectively in the beam and the fulcrum member, and an electrical circuit connected to the elements and adapted to measure the resistance thereof to give a measure of the Mach number, the resistance varying with the assumed contacting position.

4. An apparatus for measuring the Mach number of a stream of fluid comprising in combination a pair of fluid pressure sensitive capsules, each immovably anchored by one of its ends, a rigid beam supported at points spaced apart thereon by the free ends of said capsules, a fixed and curved fulcrum member against which said beam is adapted to be maintained in contact by said capsules, an evacuated chamber enclosing said capsules, beam, and fulcrum member, a pair of pressure tubes, one tube communicating with the interior of one of the capsules and terminating as a dynamic pressure orifice at its other end, and the other tube communicating with the interior of the other capsule and terminating as a static pressure orifice at its other end, said tubes serving for the application of said pressure forces to said capsules to cause said beam to roll in contact with said fulcrum member and assume a position with the point of contact located in accordance with the ratio of said pressure forces, and Mach number measuring means operative in response to said assumed position of the point of contact to give a measure of the Mach number.

5. In apparatus for comparing two forces, the combination of an electrical measuring circuit, a rigid beam member, a fixed fulcrum member, at least one of said members having a curved surface in rolling contact with the other member, at least a portion of said one member along said curved surface having known electrical characteristics along its length, at least a portion of the other member being electrically conducting and being connected in said circuit so as to form, in cooperation with said curved member, a variable element in said circuit, the effect of which upon said circuit varies in accordance with the location of the point of contact between said members, and means for applying to the beam member at spaced points thereon the forces to be compared, thereby causing the beam member to move in rolling contact with the fulcrum member until a balance condition is reached at which the effect of said variable element upon said circuit is indicative of the location of the point of contact between said members and the relation of said forces.

6. In apparatus for comparing two forces, the combination of an electrical measuring circuit, a rigid beam member, a fixed fulcrum member, at least one of said members having a curved surface in rolling contact with the other member, at least the rolling contact surfaces of the members being electrically conducting and having known but different electrical resistances per unit of length, the conducting portions of said members being connected into said circuit to serve as a variable resistance, the value of which varies in accordance with the location of the point of contact between the members, and means for applying to the beam member at spaced points thereon the forces to be compared, thereby causing the beam member to move in rolling contact with the fulcrum member until a balance condition is reached at which the resistance placed in said circuit by said members is indicative of the location of the point of contact between said members and the relation of said forces.

7. Apparatus as set forth in claim 6, in which the conducting portion of said fulcrum has relatively high electrical resistance and the conducting portion of said beam has substantially negligible resistance.

8. Apparatus as set forth in claim 7, in which the conducting portion of said fulcrum member is mounted in a body of insulating material carried by said fulcrum member.

9. Apparatus as set forth in claim 6 for measuring the Mach number of a stream of fluid, and including a pair of fluid pressure sensitive capsules each immovably anchored at one end, means for transmitting pressure from the other ends of said capsules to spaced portions of said beam to cause said beam to roll along said fulcrum to a contacting position governed by the relation of the fluid pressures in said capsules, means for establishing across the walls of one capsule a pressure difference substantially equal to the absolute dynamic pressure of the fluid stream, and means for establishing across the walls of the other capsule a pressure difference substantially equal to the absolute static pressure of the fluid stream, whereby the degree of effect upon said circuit by the resistance across said beam and fulcrum is indicative of the relation of the two fluid pressures, that is, the Mach number.

AUSTIN GEOFFREY SMITH.

REFERENCES CITED

The following references are of record in the file of this patent:

UNITED STATES PATENTS

| Number | Name | Date |
|---|---|---|
| 128,397 | Holmes | June 25, 1872 |
| 1,433,536 | Dugit-Gros | Oct. 31, 1922 |
| 1,562,936 | Ainsworth | Nov. 24, 1925 |
| 1,656,262 | Batchelder | Jan. 17, 1928 |
| 2,269,068 | Corbin | Jan. 6, 1942 |
| 2,347,695 | Leathers | May 2, 1944 |
| 2,364,728 | Leece | Dec. 12, 1944 |